Sept. 25, 1973     R. F. CAROSELLI ET AL     3,761,346
COMPOSITE LINEAR MATERIAL AND PROCESS OF MAKING SUCH MATERIAL
Filed June 15, 1970     3 Sheets-Sheet 1
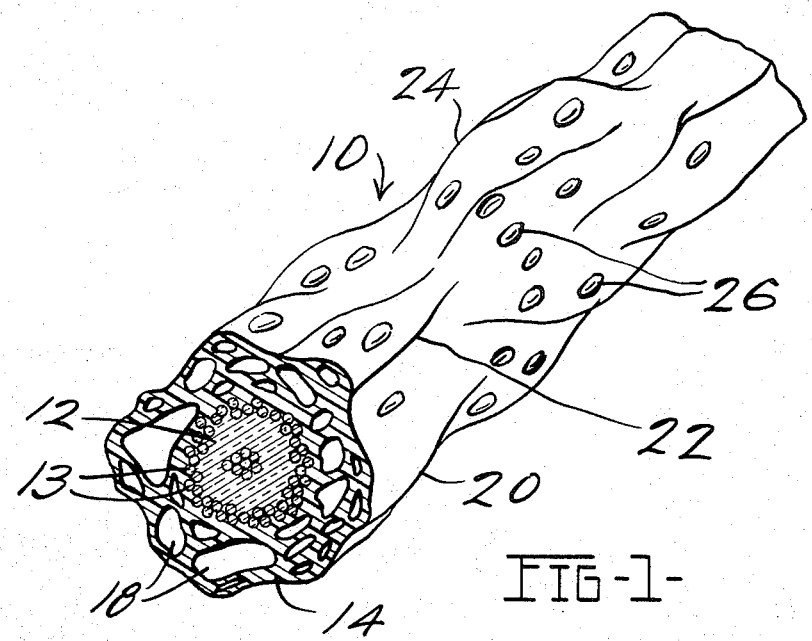
FIG-1-
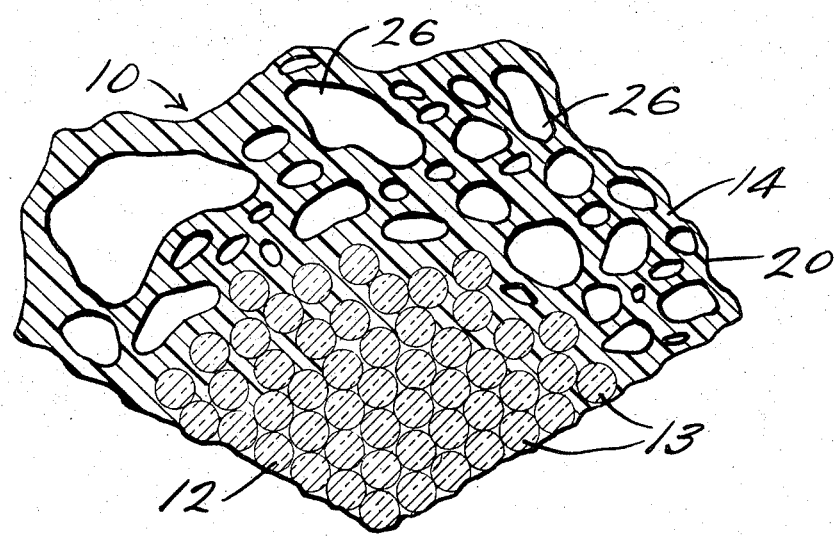
FIG-2-
INVENTORS:
REMUS F. CAROSELLI
GERALD E. RAMMEL
MICHAEL J. ROONEY
BY
ATTYS.

Sept. 25, 1973 R. F. CAROSELLI ETAL 3,761,346
COMPOSITE LINEAR MATERIAL AND PROCESS OF MAKING SUCH MATERIAL
Filed June 15, 1970 3 Sheets-Sheet 2
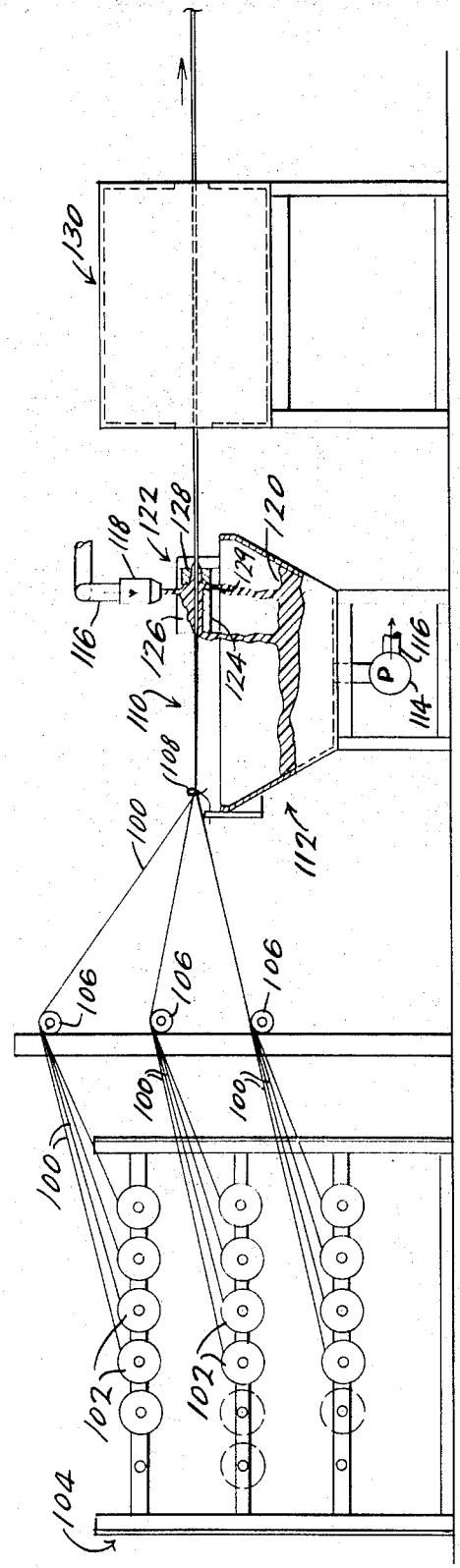
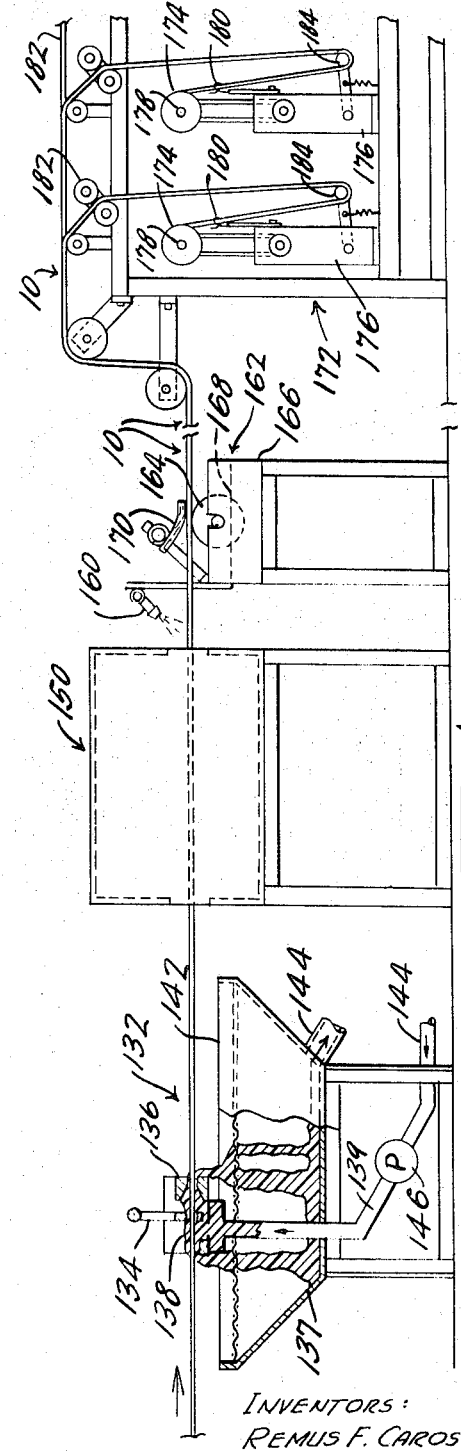
INVENTORS:
REMUS F. CAROSELLI
GERALD E. RAMMEL
MICHAEL J. ROONEY
BY
Staelin & Overman
ATT'YS.

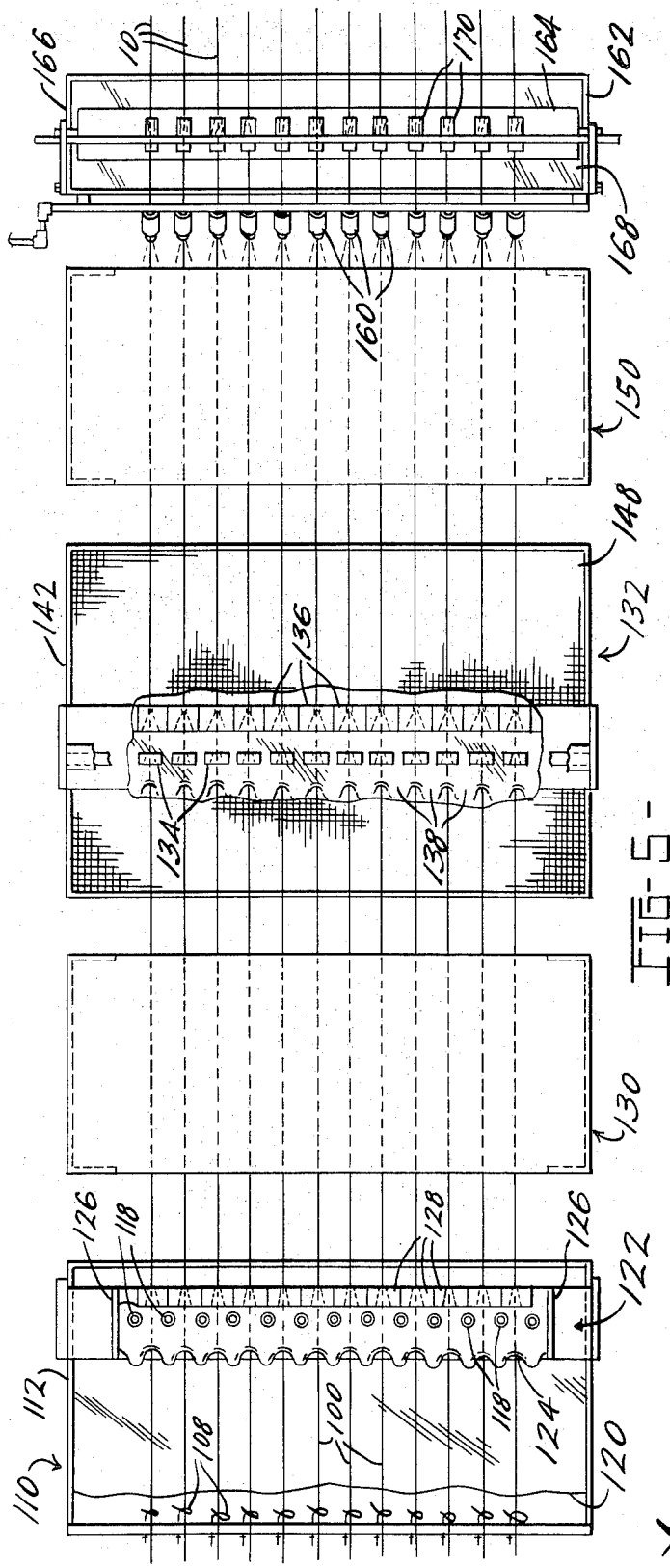
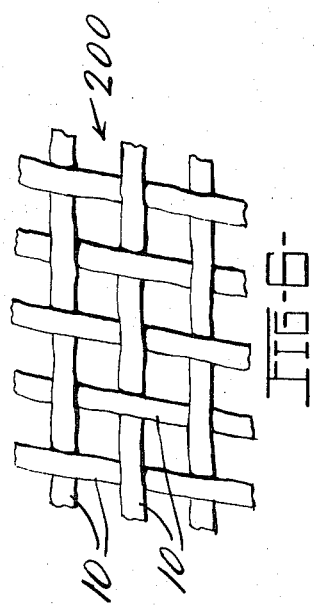

United States Patent Office 3,761,346
Patented Sept. 25, 1973

3,761,346
COMPOSITE LINEAR MATERIAL AND PROCESS OF MAKING SUCH MATERIAL
Remus F. Caroselli, Cumberland, R.I., Gerald E. Rammel, North Attleboro, Mass., and Michael J. Rooney, Lincroft, N.J., assignors to Owens-Corning Fiberglas Corporation
Continuation-in-part of abandoned application Ser. No. 888,707, Dec. 29, 1969. This application June 15, 1970, Ser. No. 46,389
Int. Cl. B32b 5/18
U.S. Cl. 161—93                            28 Claims

ABSTRACT OF THE DISCLOSURE

A composite linear material including a bundle of filaments surrounded by a flexible cellular coating of plastic composition where the outer surface of the coating is rough and nonlustrous, and the process of making such composite linear material.

---

This is a continuation-in-part application of application, Ser. No. 888,707, filed Dec. 29, 1969, now abandoned, and which has been refiled as a continuation application, Ser. No. 243,843, filed Apr. 13, 1972.

BACKGROUND OF THE INVENTION

While flexible materials of a plastic composition, particularly when foamed, have found wide use in the field of textiles as continuous film coatings on the decorative side of fabrics and as resilient backing for fabrics, their use as a coating on individual textile units such as yarns, threads, etc., used for decorative applications has been dismal. The failure of materials of plastic composition as a coating on individual multifilament textile units heretofore has been primarily their smooth shiny spongy surfaces that give an unattractive synthetic appearance and feel to a textile unit coated with these materials and the stiffness of coated textile units that give a harsh touch or hand to a fabric manufactured from them.

Yet there are textile materials, especially denser textile units such as glass strands or yarns, that one could enhance in certain fabric applications by an appealing coating of plastic composition. On a textile core such coatings could provide a lighter linear composite textile unit that gives a fabric of it a more pleasant appearance and hand. The coatings would also provide a valuable protective layer surrounding the central core. Such coatings must present an appealing appearance and hand; heretofore, such coatings could only be a desire.

The invention utilizes a single pass, multiple coating system to obtain a linear resin-glass composite possessing advantages over the prior art. When the inventive process is employed, a coated yarn is obtained, having a delustered appearance, possessing toughness and durability, having a non-uniform or disruptive surface, possessing dimensional stability, i.e. shape retention, having dry hand, i.e. not oily or slick, being light-weight and bulky in nature, possessing fire retardancy and when woven into fabric is capable of breathing and is easily cleaned.

SUMMARY OF THE INVENTION

An object of the invention is an improved composite linear textile product having a flexible coating and the process of making it.

Another object of the invention is a linear textile product that has a flexible coating with a nonlustrous outer surface.

Yet another object of the invention is a linear textile product having a flexible cellular coating of plastic composition having a wrinkled and substantially continuous outer surface.

Still another object of the invention is a process of producing a composite linear product having a flexible foam coating with a rough nonlustrous outer surface.

Still another object of the invention is a linear textile product having low specific gravity and a fabric made using such product.

Other objects and advantages will become more apparent as the invention is hereinafter described in more detail with reference made to the following drawings.

DESCRIPTION OF THE DRAWINGS

FIG. 1 is an enlarged representation in perspective of a composite linear material according to the principles of the invention.

FIG. 2 is a partial view in transverse cross section of the composite linear material of FIG. 1; the view shows partial penetration of coating material into the outer filaments of a generally central filament bundle.

FIG. 3 is a view in elevation of the first portion of apparatus operating to produce a composite linear material according to the principles of the invention.

FIG. 4 is a view in elevation of the second portion of apparatus operating with the first portion shown in FIG. 3 to produce a composite linear material according to the principles of the invention.

FIG. 5 is a plan view of a portion of the apparatus shown in FIGS. 3 and 4.

FIG. 6 is a perspective view of a fabric made using the composite linear material shown in FIGS. 1 and 2.

DESCRIPTION OF THE PREFERRED EMBODIMENTS

A plastisol is preferably applied to a linear textile material by passing the textile material through an excess of the plastisol via two coating/wiping dies and then advancing the coated textile material into an oven for partial fusion. Subsequently, a second plastisol is applied via a second set of two coating/wiping dies, followed by a second thermal treatment, sufficient to first fuse the coatings and then to activate a blowing agent therein, to create a foam-like structure.

FIGS. 1 and 2 represents a composite linear textile material 10 according to the principles of the invention where the composite 10 includes a multifilament core or bundle 12 of closely packed continuous glass filaments 13 surrounded by a flexible layer or coating 14 of plastic composition. The multifilament core or bundle of closely packed continuous glass filaments preferably have protective sizings thereon to protect the filaments during processing. Water-repellent materials may be optionally added to the sizings.

A sizing composition that has performed well to protect the glass filaments and that is compatible with the flexible coating comprises:

| Ingredients: | Percent by weight |
|---|---|
| Wax emulsion | 0.243. |
| Cationic polyester resin | 1.544. |
| High molecular weight, water soluble polymer of ethylene oxide | 2.736. |
| Gelatin, comprising amino acids having ring and straight chain structures | 0.560. |
| Di-ammonium phosphate | 0.121. |
| Stearato chromic chloride | 2.431. |
| Glacial acetic acid | pH controlled to 3.5–4.0. |
| Deionized water | Balance. |

The wax emulsion is available from Original Bradford Soap Co., Inc. under the designation Emulsion #4. The cationic polyester resin is available from Quaker Chemical Company under the designation Polymene 1104. The high molecular weight polymer of ethylene oxide is available from Union Carbide Chemicals Company under the designation Ucar-Polyox. The gelatin is available from Owens-Corning Fiberglas Corporation under the description Gelatin. The stearato chromic chloride is available from E. I. du Pont Corporation under the designation Quilon S.

The flexible coating 14 is a resilient cellular structure, illustrated as closed or unicellular, with a subtantially continuous outer surface. The coating 14 as shown is a foam plastic having cells or voids 18 that vary in size. These cells can be as large as 7 to 10 mils or more. As shown in FIG. 2, the coating 14 does not fully penetrate or impregnate the bundle 12 of filaments 13. In the embodiment the material of the coating 14 only invades the outermost filaments of the bundle 12; however, it may be useful at times to fully impregnate the bundle 12 with the material of the coating 14. Only peripheral penetration of the coating material gives a mechanical bond between the coating 14 and the core 12. When the coating material does not impregnate the entire bundle or core 12, the inner filaments of the bundle are free to move lengthwise of the bundle as the linear composite 10 bends. The coating material is capable of being stripped from the core yarn, very similar to a protective sheathing being removed from an object. Normally the coating material penetrates only from about 5 to about 50 percent of the bundle, a penetration of about 20 to 40 percent being usual. It has been useful to have the thickness of the coating 14 about equal to the diameter of bundle 12, e.g. a bundle having a diameter of around 10 mils surrounded by a layer having a thickness of from 10 to 15 mils above the bundle's lengthwise surface. One can however, vary the thickness of the coating to be less than or considerably larger than the bundle diameter. The density of the foam affects the hand, abrasion characteristics, coverage, weight, etc. The preferred density of the coating is approximately 20#/ft.$^3$, but may be as low as 5#/ft.$^3$ and as high as 35#/ft.$^3$.

The outer surface 20 of the coating 14 is substantially continuous and rough where the roughness imparts a nonlustrous appearance to the coating. As illustrated in FIGS. 1 and 2 the surface 20 is wrinkled with furrows or valleys 22 extending generally lengthwise of the composite 10 and ridges or somewhat elongated elevated portions 24 also extending generally lengthwise of the composite 10. Moreover, thin walled blister-like cell portions 26 smaller than the ridges 24 randomly punctuate the surface 20. The blister-like cell portions are substantially all closed cell structures, except for a very small number of cells whose thin wall appears to have ruptured at the time of decomposition of a blowing agent contained in the coating. These cell portions 26 are located through the surface 20. While the naked eye normally observes the surface 20 as merely nonlustrous, usually a small magnification of only about 10× to 20× clearly reveals the rugose and bullated topography of the surface 20. In most cases the height of the ridges 24 are in the range of from 5 percent to 20 percent of the mean diameter of the composite 10; however, the height of the ridges can fall outside such range. The depth of the blister-like cell portions 26 has a radical effect on the desired properties of the coated yarn. Usually, as the depth is increased, the hand or feel of the coated yarn is "dry" or "warm," whereas when the depth is decreased, the hand is "oily" or "cold." The ridges 24 and furrows 22 tend to follow the direction of the filaments 13 in the bundle 12. Accordingly, when the bundle 12 has twist, the ridges and furrows combine with each other to extend in a direction generally parallel to the filaments 13, via a generally helical path along the length of the bundle 12.

In addition to a multifilament glass core 12, one may use a variety of textile core constructions and materials. For example, the core 12 may be either a bundle of filaments or merely a monofilament; however, multifilament cores are preferred. Moreover, in addition to glass filaments, one may use filaments of other textile materials such as cotton, polyamides, polyesters, cellulosics etc. The filaments in the core 12 may be continuous or discontinuous. If one uses discontinuous filaments, these may be staple length fibers. While in multifilament construction the core 12 may be untwisted, twisted or plied, it is preferred to use single-end twisted yarn. Moreover, one may use a textured multifilament core.

The composite linear material 10 normally has a specific gravity in the range of from 3 to 6.

The coating 14 may be any suitable flexible material of plastic composition and can be a coating of either thermoplastic or thermosetting resins. While in practice good results have been obtained using vinyl coatings, one may employ as the coating material resins such as polypropylene, polyethylene, acrylonitrile butadiene styrene, styrene butadiene rubber, silicone rubbers, polyamides, polyesters, urethanes, epoxides and acrylics.

One may use a variety of liquid resinous material, i.e. liquid resin systems, to produce the coating 14 on the core 12. These systems can be liquid resin or resin dispersed in a liquid, either aqueous or solvent. When using a resin dispersed in a liquid, the resin dispersion may be a molecular dispersion, a suspension or an emulsion, or it is possible to apply a hot melt system.

The coated yarns of our invention are easily processed on conventional textile fabricating equipment using standard techniques.

The process of producing the composite linear textile material 10 includes coating a linear material such as a glass yarn with a liquid resinous material having a blowing agent that decomposes at a selected temperature during a time that the resinous material is firming into a flexible coating to effect a foaming and form a rough or wrinkled and substantially continuous outer surface. In the case of a thermosetting resin system, the blowing agent is such that it decomposes at a temperature in the range that the resin components of the system chemically react. In the case of a thermoplastic resin system the blowing agent is such that it decomposes in the fusion temperature range of the resin. In each situation, heating during the foaming must keep the coating material sufficiently fluid during the foaming to permit gas from the blowing agent to expand while retaining the gas to effect foaming and movement of the coating material to form the cellular coating 14.

Particularly good results have been obtained where the coating 14 comprises a modified vinyl resin coating as exemplified by Examples I–V having the following formulations in parts by weight.

EXAMPLE I

| Ingredients: | Parts |
|---|---|
| Polyvinyl chloride (dispersion grade) | 100. |
| Plasticizer such as a modified phthalate | 70. |
| Blowing agent stabilizers and activators | 4. |
| Cell size stabilizer | 4. |
| Blowing agent such as azodicarbonamide | 2. |
| Pigments | As required. |
| Diluents | As required. |

EXAMPLE II

| Ingredients: | Parts |
|---|---|
| Polyvinyl chloride (dispersion grade) | 100. |
| Plasticizer | 70. |
| Blowing agent stabilizer and activator | 4. |

Example II—Continued

Ingredients: Parts
- Cell size stabilizer _____ 4.
- Blowing agent _____ 6.
- Hand modifier _____ 4.
- Fire retardant _____ 5.
- Pigments _____ As required.
- Diluents _____ As required.

EXAMPLE III

Ingredients: Parts
- Polyvinyl chloride (dispersion grade) _ 50–150.
- Plasticizer _____ 50–100.
- Blowing agent stabilizer and activator _____ 1–10.
- Cell size stabilizer _____ 0.1–6.
- Blowing agent _____ 1–10.
- Hand modifier _____ 0.1–16.
- Fire retardant _____ 3–20.
- Pigments _____ As required.
- Diluents _____ As required.

EXAMPLE IV

Ingredients: Parts
- Polyvinyl chloride (dispersion grade) _ 50–150.
- Plasticizer _____ 50–100.
- Blowing agent stabilizer and activator _ 1–10.
- Cell size stabilizer _____ 0.1–6.
- Blowing agent _____ 1–10.
- Hand modifier _____ 0.1–16.
- Fire retardant _____ 3–20.
- Inorganic additives _____ 0.1–25.
- Pigments _____ As required.
- Diluent _____ As required.

EXAMPLE V

Ingredients: Parts
- Polyvinyl chloride _____ 50–150.
- Plasticizer _____ 50–100.
- Blowing agent stabilizer and activator _ 1–10.
- Cell size stabilizer _____ 0.1–6.
- Blowing agent _____ 1–10.
- Hand modifier _____ 0.1–16.
- Fire retardant _____ 3–20.
- Inorganic additive _____ 0.1–25.
- Pigments _____ As required.
- Lubricant _____ 0.1–5.
- Diluent _____ As required.

The polyvinyl chloride is commercially available under the trade designations "Opalon 400," "Opalon 410," "Opalon 7611" and "R–7611" from the Monsanto Company and "Trulon 900" and "Trulon 912" from Olin Thompson Company. The plasticizer is a modified phthalate commercially available from the Monsanto Company under the trade designations "Santicizer 213" and "Santicizer 160." The blowing agent is commercially available from National Poly Chemicals Incorporated under the designations "Kempore SDA200" and "Kempore SDA150." The blowing agent stabilizer and activator is a blend of barium, cadmium, zinc, organic compounds, chelating agents, and lubricants designated "Vanstay 6163" commercially available from the R. T. Vanderbilt Company. The cell size stabilizer is a modified polyvinyl pyrrolidone commercially available under the trade designation "FS–100" from Air Products and Chemicals, Inc. The diluent is a commercially available kerosene or other suitable mineral spirits. The hand modifier is an acrylic resin commercially available under the trade designation "ZR–93" from the Rohm and Haas Company. The acrylic resin, designated ZR–93, is a non-aqueous dispersion of an acrylic ester copolymer containing reactive functionality and additionally small amounts of aminoplast and is more fully described in U.S. Pat. No. 3,232,903 which issued Feb. 1, 1966. The fire retardant is antimony trioxide. The lubricant is a silicone commercially available under the trade designations "HV 490" and "LE 48" from the Dow Corning Corporation and Union Carbide Corporation, respectively. The inorganic additive is preferably talc.

The formulations of the examples are prepared by using the following equipment or other suitable equipment: 2000 pound Cowles Dissolver; 250 pound Cowles Dissolver; 500 gallon blend tank; and a Gyro-Screen filter.

The mixing procedure comprises preparing a premix with the 250 pound Cowles Dissolver by mixing together the stabilizer/activator, blowing agent, cell size stabilizer and approximately $\frac{1}{15}$ of the plasticizer for a period of approximately five minutes at about 750 r.p.m. Coloring pigments should be added to this premix if desired.

Subsequently, the 2000 pound Cowles Dissolver is charged with the premix prepared above and the remaining amount of plasticizer. The mixer is set for 750 r.p.m. prior to the addition of the polyvinyl chloride and the fire retardant. After the additions have been made, the speed of the mixer is increased to approximately 1000 r.p.m. and mixed for about 15 minutes, being careful not to allow the temperature of the mix to exceed 95° F.

A premix of the required amount of the hand modifier is prepared by mixing the same with an equal amount of diluent in the 250 pound Cowles Dissolver. This premix is added to the contents of the 2000 pound Cowles Dissolver by reducing the speed thereof to 600 r.p.m. and mixing for approximately 10 minutes.

The mix viscosity is then measured with a Brookfield Model LVF Viscometer with a #4 spindle. The viscosity will read about 2000–3000 cps. at this point. Sufficient diluent should be added to reduce the viscosity to 1000–2000 cps. on the Brookfield Model.

When the viscosity is adjusted to the above range, samples of the mix may be taken for color measurement. It is desirable to allow the mix to age for about 24 hours and recheck the viscosity.

A Gyro-Screen filter is used when filling drums for storage in order to insure that foreign materials are omitted.

Application viscosity of the mix ranges from approximately 1300 cps. to 1600 cps. at 80–90° F. Particles size of the mix should not exceed 75 microns, using a Hageman Gauge Drawdown.

Other additives to the formulations of this invention may be selected from the group consisting of pigmentary potassium titanate, cotton linters, perchloroethylene, water, acrylic latex emulsions, acrylic hydroxol dispersion, acetate-ethylene copolymer, nylon dispersion, ionomers, urethane, solvent solution of acrylic resin, cellulose gum (dry), high molecular weight silicone resins, dry powdered mica, cellulose acetate, wood pulps (dry and wet), corn starch, colloidal silica, fluorotelemer, carboxyl methyl cellulose, silicone rubbers, epoxidized soya bean oil, cationic lubricant, polymeric plasticizer, lacquers, ethylene oxide polymers, and milled glass fibers.

The formulations have a fusion temperature ranging from approximately 250° F. to about 450° F. The blowing agent decomposes at about 375° F. to 400° F. One can employ blowing agents decomposing at other temperatures within the fusion temperature range of the plastisol, e.g. at a lower temperature with the fusion range of the plastisol.

One can produce the composite linear material 10 by a method applying a single coating or multiple coating to the core, either in a horizontal or vertical process. If one uses a multiple coating process, the invention treats the initial coating, normally by heat, to increase its viscosity on the core to a highly-viscous gel-like consistency without decomposing the blowing agent. Subsequently the invention heats the coatings sufficiently to decompose the blowing agent and intermingle the material of the coatings to the unitary cellular coating 14 on the core.

The incorporation of an acrylic resin into the coating compositions shows that it beneficially affects the hand, i.e.

becomes drier or warmer to the touch. The acrylic resin also aids in soil release and helps provide a rough, tough surface, having substantial rigidity.

The function of the talc in the coating formulations appears to be that it aids in fire retardancy when the coating is exposed to a flame and also appears to modify the hand beneficially.

When milled fibers, of a length of from about three to about ten times the diameter of the treated yarn, are incorporated into the coating formulations, the structure of the coating appears to be strengthened, the hand is beneficially affected, and when exposed to a flame, the coated yarn shows a reduction in the amount of smoke generated therefrom.

Normally in a multicoating process the invention heats the initial liquid resinous coating to increase its viscosity. Depending upon the resin system employed, the heat will either expel liquid to dry the coating or cause the resin of the system to absorb the liquid. In either situation the viscosity of an initially heat treated resinous coating develops a highly viscous gel-like consistency. It is important to obtain fusion of the coating prior to activating the blowing agent, in order to obtain a film having bubbles or gas pockets therein.

The invention uses a final heat treatment that forms the cellular coating 14 from the resinous layers applied. When the resin used is thermosetting, the final heat treatment or cycle both decomposes the blowing agent to affect foaming and to induce chemical reaction between the resin components to form the composite linear material 10. When the resin is thermoplastic the final heat treatment or cycle both decomposes the blowing agent to affect foaming and to fuse the resin to form the composite linear material 10.

FIGS. 3–5 illustrate apparatus operating to produce a plurality of composite linear textile materials 10 where the coating 14 is a foam vinyl coating formed using the plastisol formulation given in Example I. The apparatus embodies a horizontal process applying and treating two coatings of the plastisol and includes two coating stations and two thermal ovens.

As shown, individual glass yarns 100 travel from separate serving packages 102 held in a creel 104 through guides 106 and 108 to a first coating station 110.

The station 110 includes a liquid circulating portion including a container 112, a pump 114 and lines 116 connected to nozzles 118. The liquid circulating arrangement supplies plastisol 120 to the coating apparatus including a bridge structure 122 comprising a horizontal plate 124 and end plates 126 and wiping dies 128. There is one wiping die 128 for each glass yarn 100 and one nozzle 118 for each wiping die 128. The nozzles 118 are above the bridge structure 122 and point downwardly. Each of the nozzles 118 supplies plastisol 120 to the plate 124 at a location adjacent to the entrance of a wiping die 128.

The pump operates to circulate the plastisol 120 from the container 112 to the nozzles 118 through the lines 116 to supply the plastisol 120 from the nozzles 118 to the bridge structure 122 at a rate at least slightly in excess of the rate that the traveling yarns 100 carry the plastisol away as a coating on them.

The advancing glass yarns 100 travel through accumulated plastisol adjacent to the entrance of the dies 128 and thence through the dies to affect a coating on them.

Excess plastisol 120 flows both off the rearward edge of the plate 124 and through an opening 129 at the front edge of the plate 124 into the container 112 for circulation again by the pump 114. Although plastisol 120 returns to the container 112, the pump 114 continually supplies an excess amount of the plastisol to maintain a substantial mass of the plastisol adjacent to the dies 128 on the bridge structure 122.

In the embodiment, the viscosity of the plastisol 120 and the tension and speed of the advancing glass yarns 100 combine to reduce deep penetration of the plastisol into the filament bundle of the yarns 100. A tension of from 10 to 20 grams along each of the yarns 100 is normally sufficient to bring the filaments tightly together to reduce penetration of the plastisol deeply into each of the yarns. While the viscosity of the plastisol 120 must be fluid enough for the plastisol to cling to the traveling yarns and form a coating, the plastisol must be viscous enough to cooperate with the tension in the glass yarns 100 to control impregnation of the plastisol into the glass yarns 100. Shallow peripheral penetration of from 10 to 50 percent of the plastisol 120 into the yarns 100 is usually preferred; however, complete impregnation may be desirable in certain uses. In practice good partial bundle impregnation results when the viscosity of the plastisol in the container 112 is about 1500 centipoises. Total bundle impregnation has been obtained using a plastisol viscosity of about 500 centipoises. The tension along the yarns 100 may be adjusted to assist in the control of plastisol penetration into the yarns.

The yarns 100 with a first coating travel into a heated zone such as a thermal oven 130. The temperature of the oven 130 heats the plastisol coating at least to the gelatin stage without fusing it. As the oven 130 adds heat to the plastisol coating, the plasticizer begins to penetrate into the polyvinyl chloride particles held in suspension by the plasticizer. The particles begin to swell and soften. As the polyvinyl chloride particles swell, their augmenting size forces them into contact with each other. The plastisol viscosity increases. As the softened particles continue to swell, the plastisol develops into its gelation stage where the coating is a gelled or gel-like mass. Normally the oven exposes the yarns to a heat of 420° F. to 450° F. for a period of from 2–5 seconds.

The yarns 100, with their gel-like initial coating, advance through cooler room atmosphere to a second coating station 132, including a wiper 134 and a die 136 for each of the yarns 100. The wipers 134 and dies 136 combine to add a second coating of liquid resinous material 137 over the somewhat semisolid initial coating. For purposes of illustration the liquid resinous material 137 is a plastisol of the same composition applied at the first coating station 110.

The apparatus of station 132 includes a resin flow system that circulates the liquid plastisol 137 to provide a quantity of the liquid plastisol 137 at the entrance region of the wiper 134, indicated at regions 138. A supply line 139 carried the liquid plastisol 137 to the zone 138 adjacent the wiper 134. The resin flow system circulates the liquid plastisol from a container 142 that drains the liquid plastisol 137 into a collection line 144. A pump 146 connects the collection line 144 with the supply line 139 and advance the plastisol 137 to the exit of the supply tube 139. The pump 146 advances sufficient plastisol to keep the slot of the wiper 134 substantially full of the plastisol as the yarns 100 travel through the slots.

The once coated glass yarns 100 travel into the accumulation of liquid plastisol 137 at regions 138 and into the wipers 134, which include a slot for each of the yarns. Each of the yarns 100 emerges from the exit side of a wiper 134 to immediately enter a die 136. Excess liquid plastisol falls onto the container 142 through a screen 148.

The liquid resinous material 137 applied at the second coating station 132 may be the same as or different from the liquid plastisol applied at the first coating station 110. If the second coating is a thermoplastic, its fusion temperature should be generally the same as the fusion temperature of the first coating. Moreover, the blowing agent should have a decomposition temperature not lower than the fusion temperature of the coatings. Further, the color of the plastisol applied at the second coating 132 may be the same as or different from the color of the plastisol applied at the first coating station 110. For example, one may use sharply contrasting colors such as red and blue, or may use white as the initial coating with a green top coat to achieve a textured look to the final product, or one may accomplish a tone on tone effect by using two shades of the same color. In each case portions of each color are visible. Usually the thickness of the second coating is less than the thickness of the first coating, but the reverse may be feasible and in fact preferred under certain circumstances. It may be useful to coat the glass yarns 100 with one resin composition at the first station 110 and coat the yarn the second time with a different resin composition. Further, it may be useful at times to employ a coating, either initial or subsequently coating, that does not contain a blowing agent, especially the coating applied at the second station 132, in order to obtain properties not obtainable when a blowing agent is included therein, e.g., hardness, toughness, etc. Such a coating may be in addition to the second coating and may be a solvent or aqueous dispersion of silicones, urethanes, or acrylics. It may also be useful at times to employ sufficient heat in the first oven 130 to decompose the blowing agent followed by a second coating which is heated sufficiently to decompose its blowing agent.

After leaving the second coating station 132 the glass yarns 100 travel to a second heated zone such as a thermal oven 150. The temperature in the second oven 150 is high enough to heat both coatings sufficiently to fuse them and decompose the blowing agent. As the oven 150 heats the coatings, the resin fuses; the resin of the second coating passing through gelation into a hot melt fusion condition. The two coatings mingle; the separate identity of the coatings is lost. In the fused stage the oven 150 heats the plastisol to keep it sufficiently fluid to permit the gas from the blowing agent to expand while maintaining the fused plastisol sufficiently cohesive to retain the gas to effect foaming and movement of the fused plastisol to form the cellular coating 14 with its rough or wrinkled and substantially continuous outer surface. Normally the surface of the coating 14 develops the blister-like cell portions 26. As the blowing agent releases the gas, cells begin to grow. As the cells grow in the fused plastisol some of the adjacent cells coalesce to produce some larger or coarser cells with larger pockets of gas. The oven 150 exposes the yarns 100 to a temperature of from 500° F. to 550° F. for a period of from 2 to 5 seconds. It is preferable to have the second oven 150 at a temperature of from about 120° F. to about 180° F. higher than the temperature of the first oven 130.

Each of the coated yarns 100 emerge from the second oven 150 as a composite linear material 10 with a unitary coating of flexible foam vinyl. The percent by weight of the coatings, based on the weight of the composite linear material ranges from about 60 percent to about 80 percent by weight, and most preferably is about 75 percent by weight.

As the linear composite 10 leaves the oven 150, means such as nozzles 160 spray water onto them to assist cooling the coatings to fix their cellular structure and rough outer surface. Subsequently the linear composites 10 cross an applicator 162 that transfers suitable lubricant 168 such as an emulsion of dimethylsilicone oil to the composites to enhance their weavability. The coated yarns are subsequently exposed to post-treating operations, such as beaming, and weaving. The suitable lubricant 168 reduces and maintains uniform tensions in the yarns during weaving and also aids in abrasion resistance during these post-treating operations. As illustrated, the applicator 162 includes a longitudinal cylindrical member 164 rotatably mounted on a longitudinal container 166. The cylindrical member 164 passes through the liquid lubricant 168 held in the container 166. The applicator may include moist felts 170 or the like to assist uniform application of the lubricant 168 onto the traveling composite 10. If desired the apparatus can apply a lubricant with the water spray.

The coated yarn is preferably cooled rapidly after leaving the final oven and prior to contacting any guide points, in order to avoid flattening of the coating on the strand. Suitable lubricants that have performed well, in the cooling step are a 5 percent solution of HV 490 silicon (Dow Corning Corporation) and a 5 percent solution of LE 48 silicone (Union Carbide Corporation). However, it has been found feasible to add the lubricant to the final coating and provide the necessary lubricity without affecting the other desired properties.

A winding machine 172 collects the composite linear materials 10 into individual wound packages 174. The winding machine 172 includes a variable speed drive 176 for rotating individual spools 178, a reciprocating guide 180 for each of the spools 178, a pair of constant speed feeding wheels 182 and a speed control pulley 184. As each of the driven spools 178 advance composite linear material 10, variations in tension along each of the composites 10 raises or lowers its individual control pulley 184, which controls an associated variable speed drive 176 to keep each of the spools 178 rotating at a rate maintaining substantially constant the linear speed of the composite linear material 10.

FIG. 6 shows a portion of a woven fabric 200 where both the woof and warp are composite linear material 10. One may construct a variety of fabrics using composite linear material 10. For example, a fabric may be either woven, knitted, or nonwoven and/or employ the composite linear material 10 only in one direction in the fabric, i.e. either the warp or the woof.

In addition to the pleasing appearance of the fabric 200 the rough surfaces 20 engage each other at crossover locations in the fabric 200 to reduce unwanted sliding movement of the composite linear material 10 in the fabric. This quality of the composite linear material 10 promotes more uniform distribution of dynamic forces in the linear material 10 within the fabric 200, even when one conforms the fabric to an object, e.g. a chair when the fabric is an upholstery fabric.

When our coated yarn has been withdrawn from a woven fabric, it has an appearance resembling a glass yarn, untreated with the inventive coating, which has been heat set in the fabric. The above-described coated yarn appears wavy or crimped along its length from the pressure applied at the cross-over points in a woven fabric, formed by warp and fill yarns. This is a very important contribution to the art because if the coating did not deform at the cross-over points of the yarns in the fabric, dimensional stability of the fabric would have to be provided for in another manner. To reduce the tendency of some weave patterns from raveling however, we have found it desirable to give the fabric a light heat treatment (approximately 200° F. for 80–90 seconds) in a tenter frame. This heat treatment lightly bonds the warp and fill cross-over points without destroying the hand or the breathability of the fabric.

It is apparent that within the scope of the invention modifications and different arrangements may be made other than as herein disclosed. The present disclosure is merely illustrative and the invention comprehends all variations thereof.

What is claimed is:

1. A composite linear material capable of being woven into fabric comprising glass yarn in the form of a multiplicity of glass filaments, wherein said glass yarn has a resilient, continuous delustered foamed coating thereon, wherein the foamed coating partially penetrates into the glass yarn whereby the foamed coating is bonded to substantially only the outermost glass filaments that make up the glass yarn, and whereby the glass yarn is substantially free to move independently within the foamed coating when subjected to dynamic forces, and said foamed coating being wrinkled with furrows and ridges extending generally lengthwise of the glass yarn and said foamed coating comprising thin walled blister-like cell portions smaller in size than the ridges, wherein said cells randomly punctuate the foamed coating.

2. The composite linear material as claimed in claim 1 wherein the foamed coating is of a thickness of substantially the diameter of the glass yarn.

3. The composite linear material as claimed in claim 1 wherein the cell size is non-uniform throughout the foamed coating.

4. The composite linear material as claimed in claim 1 wherein the height of the ridges ranges from about 5 percent to about 20 percent of the mean diameter of the composite.

5. The composite linear material as claimed in claim 1 wherein the density of the foamed coating ranges from about 5#/ft.³ to about 35#/ft.³.

6. The composite linear material as claimed in claim 1, wherein the glass filaments have a coating of a protective sizing composition thereon.

7. The composite linear material as claimed in claim 1, wherein the foamed coating ranges from about 60–80 percent by weight, based upon the total weight of the composite.

8. The composite linear material as claimed in claim 1, wherein the foamed coating is 75 percent by weight, based upon the total weight of the composite.

9. The composite linear material as claimed in claim 1, wherein the specific gravity of the composite ranges from about 3 to about 6.

10. The composite linear material as claimed in claim 1 wherein the foamed coating results from heating at least two previously applied foamable compositions to the glass yarn.

11. The composite linear material as claimed in claim 10 wherein the foamed coating visually possesses pigments of different color, resulting from incorporating the pigments in the previously applied foamable compositions.

12. A composite linear structure, comprising glass yarn wherein said glass yarn comprises a multiplicity of sized glass filaments, and wherein said glass yarn has a resilient, continuous delustered foamed coating which partially penetrates the outer periphery of filaments of the yarn, said coating possessing a wrinkled surface with furrows and ridges extending generally lengthwise of the glass yarn and wherein the foamed coating further comprises randomly oriented non-uniform thin walled blister-like cell portions smaller than the ridges, and wherein the foamed coating results from heating a resin system comprising, when applied, in parts by weight:

(a) Polyvinyl chloride _____ 50–150.
(b) Dioctylphthalate _____ 50–100.
(c) Antimony trioxide _____ 1–10.
(d) Barium-cadmium-zinc compound __ 0.1–6.
(e) Azo-dicarbonamide _____ 1–10.
(f) Solvent dispersed acrylic resin _____ 0.1–16.
(g) Terpolymer of vinyl pyrrolidone __ 3–20.
(h) Talc _____ 0.1–25.
(i) Pigmented dispersions _____ As required.
(j) Mineral spirits _____ As required.

13. The composite linear structure as claimed in claim 12 wherein dimethyl silicone oil is present in the resin system, when applied, in an amount of from 0.1 to 5.0 parts by weight.

14. A woven fabric comprising warp and woof yarns of an organo-vitreous linear foamed composite comprising a high strength glass yarn core which glass yarn further comprises a multiplicity of sized glass filaments and a foamed polymeric structure which partially penetrates into the core sufficient to prevent the foamed structure from being peeled from the yarn, but insufficient to prevent relative movement of the glass filaments within the yarn core, wherein the foamed structure is wrinkled with furrows and ridges extending generally lengthwise of the glass yarn and said foamed structure further comprises thin walled blister-like cell portions smaller in size than the ridges, wherein said cells randomly punctuate the foamed structure, and wherein the foamed structure results from heating a resin system, said resin system comprising, when applied, in parts by weight:

(a) Polyvinyl chloride _____ 50–150.
(b) Dioctylphthalate _____ 50–100.
(c) Antimony trioxide _____ 1–10.
(d) Barium-cadmium-zinc compound__ 0.1–6.
(e) Azo-dicarbonamide _____ 1–10.
(f) Solvent dispersed acrylic resin ____ 0.1–16.
(g) Terpolymer of vinyl pyrrolidone __ 3–20.
(h) Talc _____ 0.1–25.
(i) Pigmented dispersions _____ As required.
(j) Mineral spirits _____ As required.

15. The woven fabric as claimed in claim 14 wherein dimethyl silicone oil is present in the resin system, when applied, in an amount of from 0.1 to 5.0 parts by weight.

16. A woven glass fiber yarn fabric suitable for dynamic uses, wherein the fabric comprises precoated temperature and moisture resistant foamed polymeric resin coated glass fiber yarns in the warp and woof directions of the fabric, wherein the glass fiber yarns have a foamed coating partially penetrating into the glass fiber yarns whereby the foamed coating is bonded to substantially only the outermost glass filaments that make up the glass fiber yarns and wherein the foamed coated glass fiber yarns are wrinkled with ridges and furrows extending generally lengthwise of the foamed coated glass fiber yarns, and wherein the foamed coated glass fiber yarns have cells of varying size randomly punctuating and smaller than the ridges in the foamed coated glass fiber yarns, so that the yarns are mechanically locked into place at the cross-over points of the warp and woof yarns of the fabric and wherein the fabric is breathable and is easily cleaned.

17. A method for producing a foamed organo-vitreous linear composite suitable for use in the fabrication of fabrics comprising the steps of treating advancing glass yarns by:

(a) applying a first coating of a foamable polymeric dispersion to continuous glass yarns comprising a multiplicity of glass filaments, wherein the composition penetrates substantially only the peripheral filaments of the glass yarns;

(b) heating the first coating on the glass yarn until fusion of the dispersion occurs sufficient to obtain a continuous film about the yarns;

(c) applying a second coating of a foamable polymeric dispersion to the fused coating on the glass yarns;

(d) heating the second coating until a film, capable of adhering to the first coating, is obtained to form a homogeneous matrix, and further heating the homogeneous matrix until a blowing agent, incorporated in the dispersions is activated to expand the homogeneous matrix into a foamed structure on the glass yarns;

(e) cooling the foamed structure immediately after heating in step (d) in order to retain the shape of the structure on the glass yarns;

(f) supplying a dimethyl silicone oil lubricant to the cooled foamed structure in order to obtain proper tension values for the foamed structure so that the foamed structure is suitable for weaving operations; and (g) collecting the foamed organo-vitreous composite on a package for use in subsequent operations.

18. The method as claimed in claim 17 wherein the viscosity of the dispersions of steps (a) and (c) range from about 1300 cps. to about 1600 cps.

19. The method as claimed in claim 17 wherein the second coating is heated to approximately 100° F. to 180° F. above the temperature of the first coating whereby the temperature is sufficient to prevent obtaining a shiny surface but insufficient to burst the formed cells, so that a wrinkled, delustered surface results.

20. The method as claimed in claim 17 wherein the cooling of the foamed structure is accomplished by spraying water, at room temperature, onto the structure immediately after the second heating.

21. The method of claim 20 wherein the cooling of the foamed structure further comprises adding a dimethyl silicone oil lubricant to the water so that the foamed structure will have uniformly low tensions suitable for weaving operations.

22. The method as claimed in claim 17 wherein the polymeric dispersion is heated in step (b) to a temperature sufficient to activate the blowing agent.

23. The method of claim 17 further comprising, applying a third coating of a material that provides additional hardness and toughness to the linear composite.

24. The method of claim 23 wherein the material is a dispersion selected from the group consisting of urethane, silicone, and acrylic resins.

25. The method of claim 17 wherein the first coating comprises a pigment different in color than the pigment in the second coating, and wherein the composite visually possesses both colors.

26. A method for producing a foamed linear organo-vitreous composite suitable for use in the fabrication of fabrics comprising the steps of:
   (a) advancing a multiplicity of core yarns comprising sized glass filaments to a first coating station at speeds and under tensions sufficient to coat the core yarns with a foamable resin system without substantial impregnation of the core yarns;
   (b) coating the core yarns with the foamable resin composition said composition comprising, when applied, in parts by weight:
      (a) Polyvinyl chloride .......... 50–150.
      (b) Dioctylphthalate .......... 50–100.
      (c) Antimony trioxide .......... 1–10.
      (d) Barium - cadmium - zinc compound .......... 0.1–6.
      (e) Azo-dicarbonamide .......... 1–10.
      (f) Solvent dispersed acrylic resin .......... 0.1–16.
      (g) Terpolymer of vinyl pyrrolidone .......... 3–20.
      (h) Talc .......... 0.1–25.
      (i) Pigmented dispersions .......... As required.
      (j) Mineral spirits .......... As required.
   (c) heating the first coating on the core yarns sufficiently to obtain a continuous film;
   (d) advancing the core yarns with the continuous film thereon to a second coating station to obtain a second coating on the advancing core yarns;
   (e) coating the core yarns with additional foamable resin composition;
   (f) heating the second coating until a second film forms and adheres to the first film to form a homogeneous matrix, and further heating the homogeneous matrix to decompose a blowing agent incorporated in the coatings sufficiently to form a foamed structure, comprising substantially only closed cells, which formed structure partially penetrates into the core yarns;
   (g) subjecting the foamed composite immediately after the heating step (f) and prior to contacting any guide means, to a cooling zone in order to retain a circumferential configuration of the structure on the core yarns; and
   (h) collecting the foamed linear organo-vitreous composite on a package for use in subsequent operations.

27. The method as claimed in claim 26 further comprising directing a water spray comprising dimethyl silicone oil onto the foamed composite in the cooling zone of step (g) in order to obtain uniformly low tension values on the composite which renders the composite suitable for weaving operations.

28. The method of claim 17 wherein the first coating is applied at a thickness greater than the thickness of the second coating.

References Cited
UNITED STATES PATENTS

| | | | |
|---|---|---|---|
| 3,091,019 | 5/1963 | Wetterau | 28—80 |
| 3,244,545 | 4/1966 | Marzocchi et al. | 161—93 |
| 3,278,329 | 10/1966 | Wiczer | 117—126 GB |
| 3,309,861 | 3/1967 | Pierson et al. | 57—140 G |
| 3,323,975 | 6/1967 | Marzocchi et al. | 117—126 GB |
| 3,417,038 | 12/1968 | Soltys | 260—2.5 P |
| 3,462,523 | 8/1969 | Marzocchi et al. | 117—126 GB |
| 3,490,985 | 1/1970 | Marzocchi et al. | 117—126 GB |
| 3,551,186 | 12/1970 | Martin et al. | 117—126 GB |
| 3,444,116 | 5/1969 | Gagnon et al. | 117—126 GB |

DANIEL J. FRITSCH, Primary Examiner

U.S. Cl. X.R.

57—140 G, 164; 117—41, 45, 76 T, 119.4, 126 GR, 139.5 A; 161—160, 175, 180